(12) United States Patent
Bell

(10) Patent No.: US 7,589,640 B2
(45) Date of Patent: Sep. 15, 2009

(54) UTILITY POLE AND TOWER SAFETY AND PROTECTION DEVICE

(76) Inventor: Dennis Lee Bell, 503 West St., Philipsburg, MT (US) 59859

( * ) Notice: Subject to any disclaimer, the term of this patent is extended or adjusted under 35 U.S.C. 154(b) by 534 days.

(21) Appl. No.: 11/265,993

(22) Filed: Nov. 3, 2005

(65) Prior Publication Data

US 2006/0169470 A1    Aug. 3, 2006

Related U.S. Application Data

(60) Provisional application No. 60/648,259, filed on Jan. 28, 2005.

(51) Int. Cl.
*G08B 21/00* (2006.01)

(52) U.S. Cl. ............ 340/687; 340/689; 340/686.1

(58) Field of Classification Search ........... 340/310.11, 340/310.17, 310.18, 686.1, 686.3, 687, 689, 340/693.9; 254/134 PA, 134 R, 395; 248/219.4, 248/320; 212/179; 174/44
See application file for complete search history.

(56) References Cited

U.S. PATENT DOCUMENTS

| | | | | |
|---|---|---|---|---|
| 3,805,054 A | * | 4/1974 | Wolf | ............ 362/403 |
| 3,913,688 A | * | 10/1975 | Heilhecker et al. | ....... 340/855.1 |
| 4,684,031 A | * | 8/1987 | Bergman et al. | ............ 212/179 |
| 5,975,726 A | * | 11/1999 | Latimer | .................. 362/384 |
| 7,164,079 B2 | * | 1/2007 | Zahnen et al. | ............. 174/44 |
| 7,216,850 B2 | * | 5/2007 | Kwon | .................... 254/395 |

* cited by examiner

*Primary Examiner*—Van T. Trieu
(74) *Attorney, Agent, or Firm*—Dale B. Halling

(57) ABSTRACT

A Utility Pole and Tower Safety and Protection Device includes a utility pole with a crossbar to support utility conductors. The crossbar is attached to the pole with a release mechanism. A pressure transducer is attached to the release mechanism and automatically controls the release and descent of the crossbar at a predetermined load limit. A shear pin may also be used if a mechanical system is desired. An alarm system is attached to the pole and linked to a relay station announces when the system is activated. Power and continuity to the utility conductors is terminated when the system is activated, virtually eliminating the risks of a downed utility conductor. The device protects power and utility lines from breakage due to external forces, such as weather or trees. When the external force is removed, the device is reset by winching the crossbar into position and resetting the release mechanism.

18 Claims, 12 Drawing Sheets

UTILITY POLE AND TOWER SAFETY AND PROTECTION DEVICE

PRIORITY DATA

This application is a claims priority from U.S. patent application Ser. No. 60/648,259 filed on Jan. 28, 2005, entitled "Utility Pole And Tower Safety And Protection Device" and is hereby incorporated by reference.

FIELD OF THE INVENTION

This invention relates generally to the field of utility poles. More specifically, it relates to such apparatus for utility poles and towers for protection against electrical shock with downed conductors, telephone lines, broken poles and towers as a result of adverse weather such as ice storms, strong winds and the like. Additionally, the new and novel device provides for much faster restoration of power and services while saving large amounts of money and resources.

BACKGROUND OF THE INVENTION

Prior Art utility pole and towers are permanently assembled with cross arms, conductors, insulators and the like. These assemblies are costly to purchase, assemble and maintain. Historically, thousands of miles of utility lines have been lost to adverse weather and other external forces, costing enormous amounts of money to replace. Many consumers who depend on the utility supply have been left without service for weeks at a time, resulting in huge losses of produce, dairy and other inventory and equipment. Further, insurance companies are burdened by the large claims that result from the loss of utility services.

The prior art does not provide a means in all cases to cease the flow of power to downed conductors and transformers. Downed conductors often result in loss of life and damage or destruction of property. However, while there are myriad of assemblies for utility transmission systems, none provide a convenient means of selectively lowering power lines to the ground for maintenance, repair or construction. The prior art provides that a lineman must climb a utility pole or use a bucket lift to lower, assemble or repair electrical conductors or components. This can be dangerous, time consuming and expensive. In addition, the prior art does not provide for a warning signal means when lowering these dangerous power lines and apparatus, either audible or visual.

Prior art utility systems are also sensitive to resistance and heat build up in the conductors. This results in progressively higher resistance and the inefficient transmission of current. Heavy loads of ice and high winds and the like can cause stretching and sagging of the conductors where conductors are reduced in diameter. This further reduces the capacity of the conductor. Obviously, where the conductors have exceeded their limits of strain they must be replaced, at great expense.

Thus, what is needed is a system that monitors and responds to external stresses on utility conductors to prevent damage to these valuable conductors. The system should be automatic and should prevent live utility lines at ground level. Further, the device should be easy for utility crews to repair and reset.

It is intended that any other advantages and objects of the present invention that become apparent or obvious from the detailed description or illustrations contained herein are within the scope of the present invention.

SUMMARY OF THE INVENTION

The present invention provides a new and useful Utility Pole and Tower Safety and Protection Device which virtually eliminates the loss of revenue and replacement costs due to irreparable damage. The device provides several advantages over the prior art, including improved safety features, and easy maintenance, management, construction and control. This device overcomes the deficiencies in the prior art and teaches safety and warning measures to minimize costly and tragic loss of life and property.

The Utility Pole and Tower Safety and Protection Device includes a utility pole with a crossbar to support utility conductors. The crossbar or utility conductor assembly is attached to the pole with a release mechanism, such as a shear pin. A pressure transducer is attached to the release mechanism and automatically controls the release and descent of the crossbar at a predetermined load limit. An alarm system is attached to the pole and the release mechanism, and may be linked to a relay station to announce when the system is activated.

Power and continuity to the utility conductors is automatically terminated when the system is activated, virtually eliminating the risks of a live, downed utility conductor. A magnetic switch may be used to terminate power to and through the conductors. The device protects power and utility lines from breakage due to external forces, such as weather or trees. When the triggering external force is removed, the device is reset by winching the crossbar into position and resetting the release mechanism.

The device is simple to implement and easy to operate. An external load is applied to the utility conductors or apparatus. As the external load approaches a predetermined limit, the release mechanism is activated, along with visual and audible alarms. An activation signal is sent to a relay station and the utility is instantly shut off as the utility conductors descend to the ground.

As the external load is removed, the device enables quick and safe reactivation of the utility conductors. Maintenance crews will ascertain the integrity of the conductors and members which at this point are free of ice, wind or other weight sources. Maintenance crew will attach a winch to the cable. The cross arm assembly and conductors are raised back into operating position. A new release means, such as a shear pin, is fitted. Finally, continuity is restored and the utility is switched back on.

The novel invention described here provides a controlled breakaway feature which separates the conductors or power lines from the supporting means while preventing irreparable damage to poles, towers, conductors and other components of utility and phone lines. The breakaway feature provides prophylaxis against the breakage of any of the several components of a utility line. The breakaway device incorporates a shear pin or other means which anticipates the breaking point of any of the components of the utility transmission system. As the breaking point is approached, as a result of ice buildup, wind or other force, the shear pin or other breakaway means activates and allows the conductors to fall to the ground before breakage occurs. Further, in the event the system is activated, the device safely disconnects the utility source from the conductors.

The device eliminates the need to ascend a pole or tower for most routine and emergency maintenance or construction, because virtually all of the work can be accomplished from the ground.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

Figure 1:
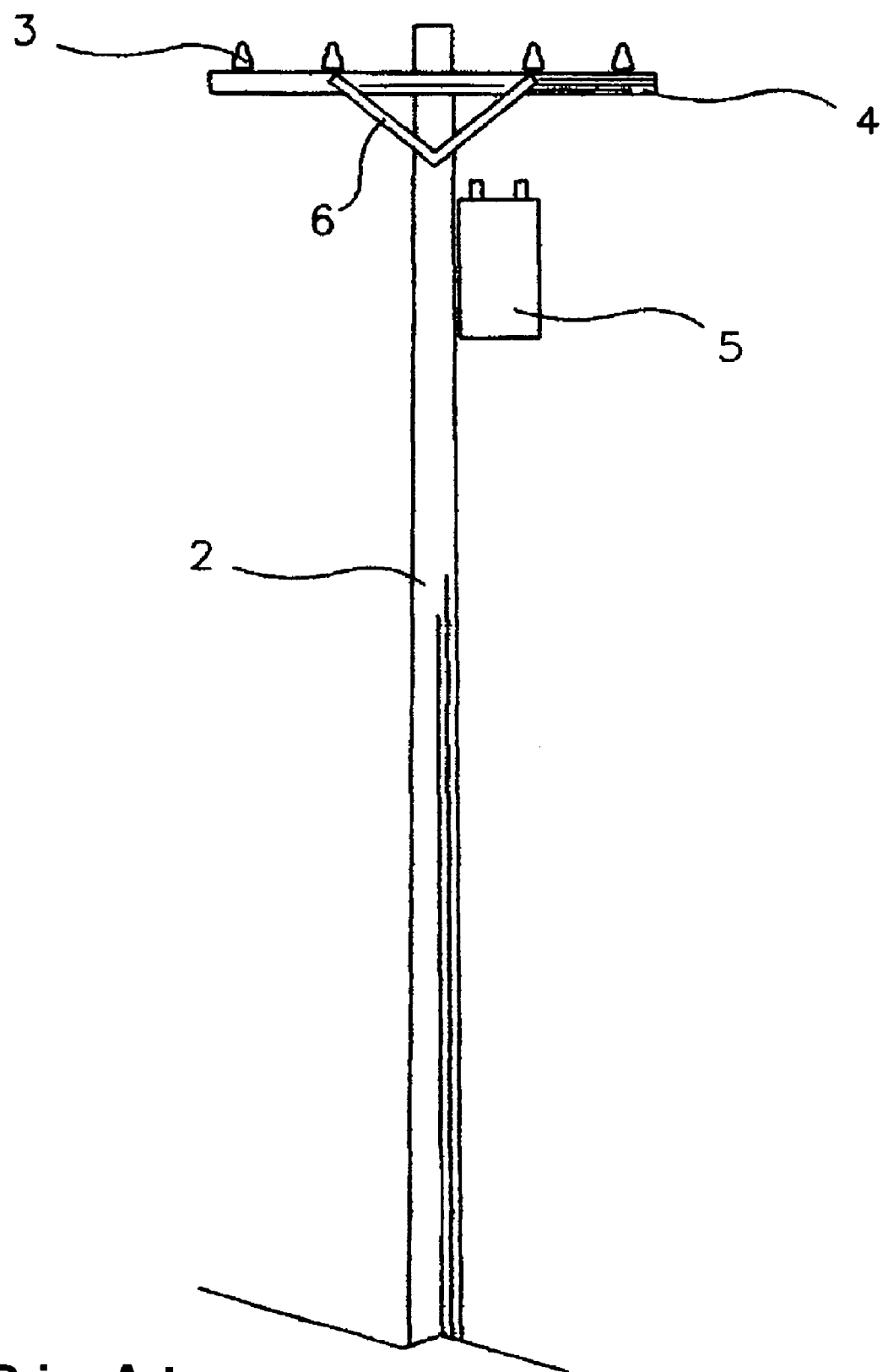
FIG. 1. is a perspective view of a typical prior art utility pole with its several components in assembly in normal condition given for reference.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DETAILED DESCRIPTION OF THE INVENTION

Referring now to the drawings, the attached figures illustrate a Utility Pole and Tower Safety and Protection Device 1.

Figure 2:
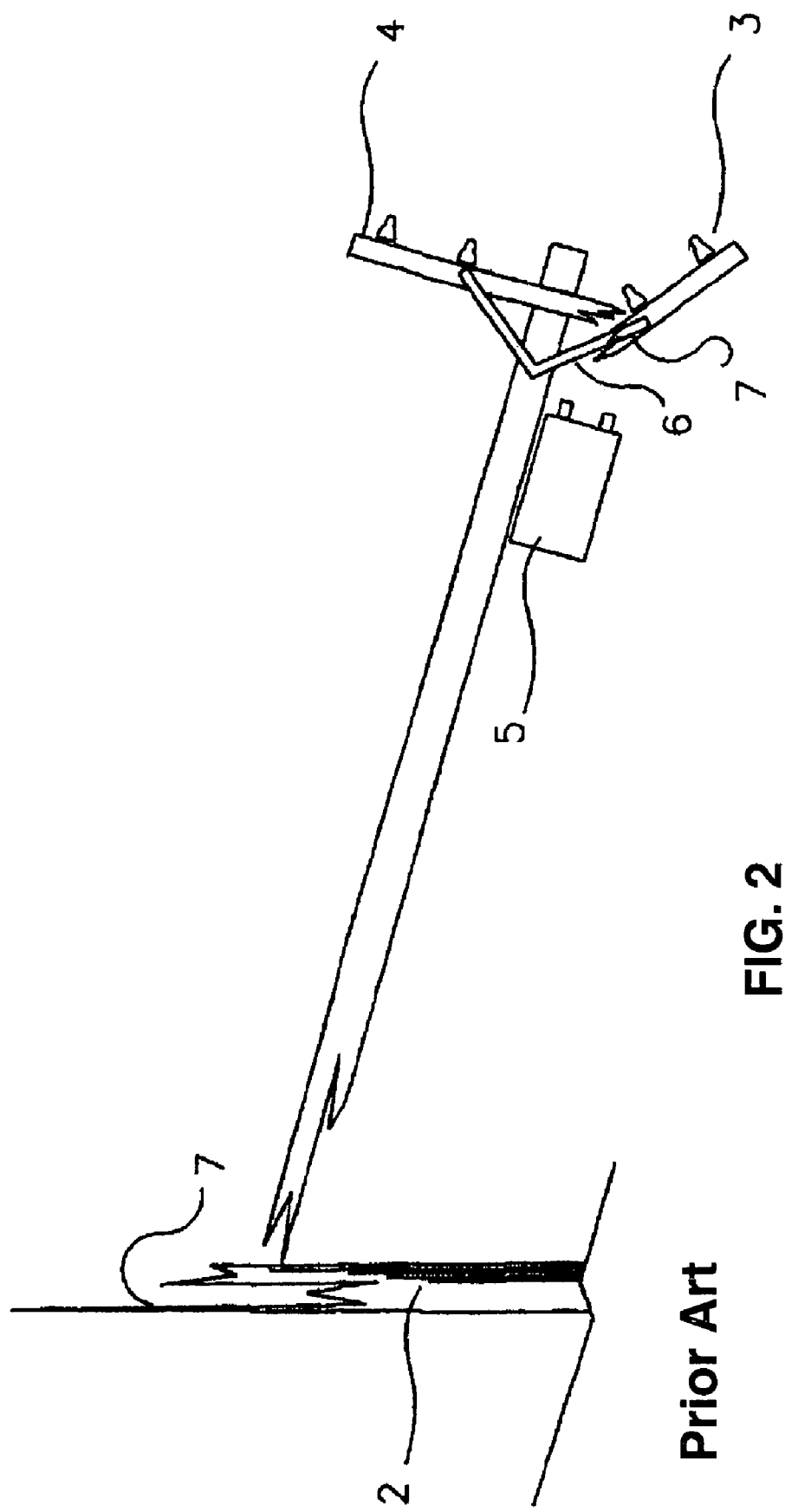
FIG. 2. is a perspective view of typical prior art utility pole with its several components after being damaged.

FIG. 1 and are provided to illustrate utility poles 2 of prior art. The pole 2 includes a cross arm 4, insulators 3, and a brace 6 affixed in typical position below the cross arm 4. A transformer 5 is illustrated in typical mounting position below the cross arm 4. The poles 2 may be wood or metal towers or any suitable structure that can support the device 1. FIG. 2 demonstrates devices of prior art in a broken state 7. As shown in FIG. 1, the fallen poles 2 and cross arms 4 are typically oriented in a position to cause damage 7 to the cross arms 4 as they fall.

Figure 3:
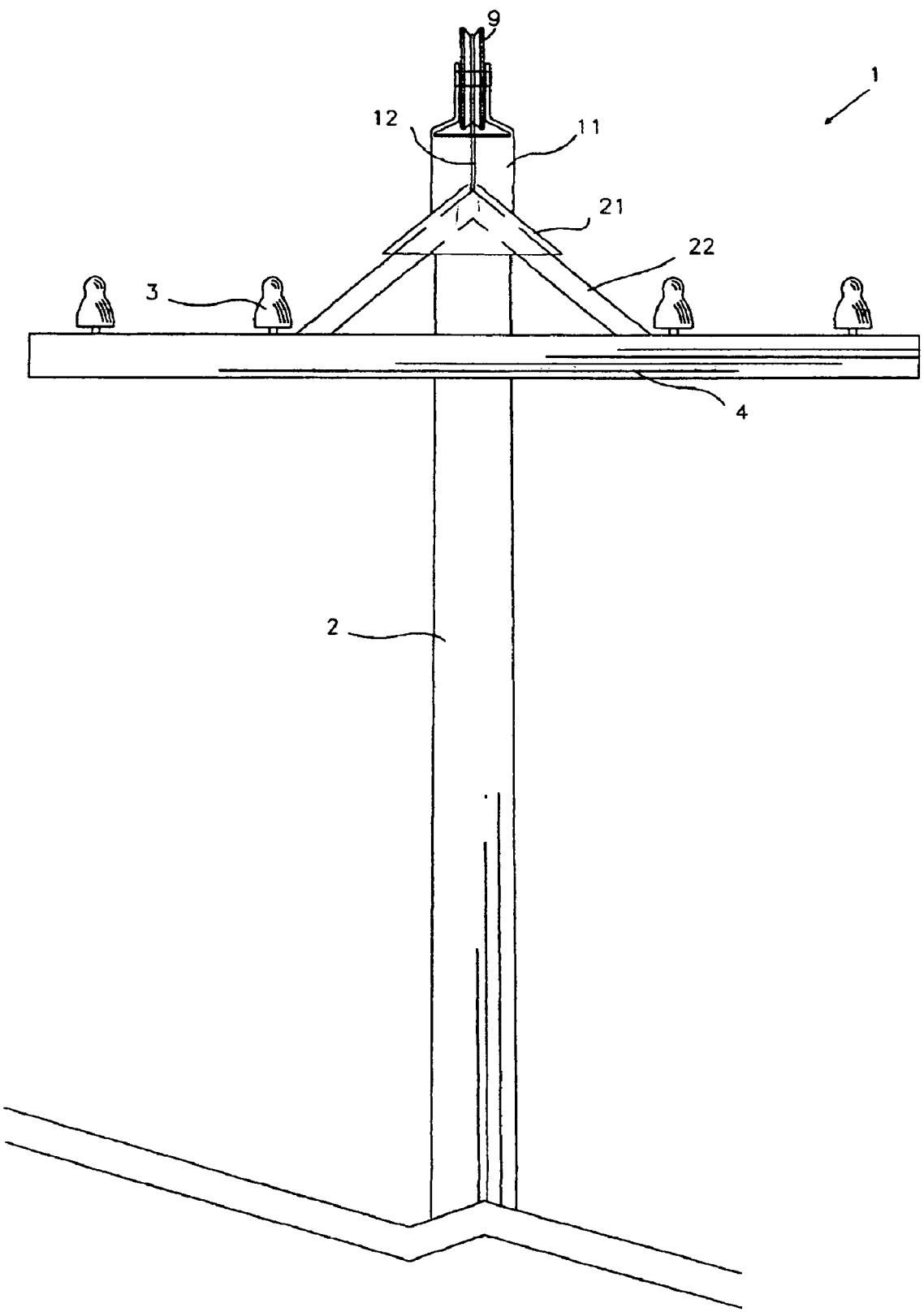
FIG. 3. is a perspective frontal view of the upper portion of a Utility Pole and Tower Safety and Protection Device according to the present invention.

FIG. 3 provides a clear view of a pulley or bearing 9 which channels a cable 12 about a mounting bracket 11. The mounting bracket 11 has a docking yoke 21. A docking brace 22, which provides attachment and stability to cross arm 4 engages the docking yoke 21. The cable 12 is attached to the apex of docking yoke 22 and acts to lead the docking brace 22 accurately into docking yoke 21.

Figure 4:
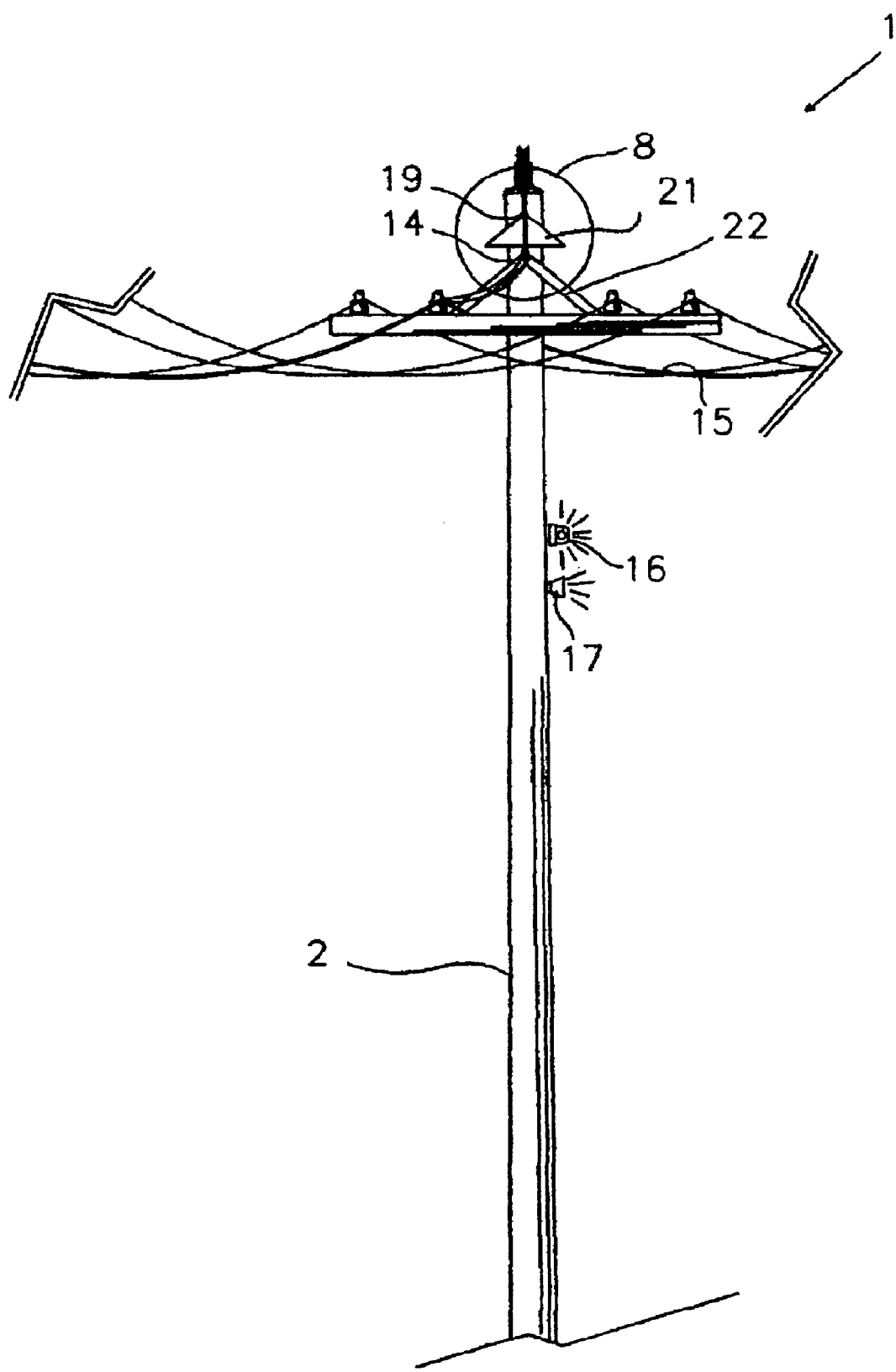
FIG. 4. is a frontal view of a Utility Pole and Tower Safety and Protection Device according to the present invention.

FIG. 4, shows the invention 1 assembled atop a prior art pole 2. A detail view 8 is further described in FIG. 6. A visual alarm 16 and an audible alarm 17 are optionally attached to the pole 2.

Figure 5:
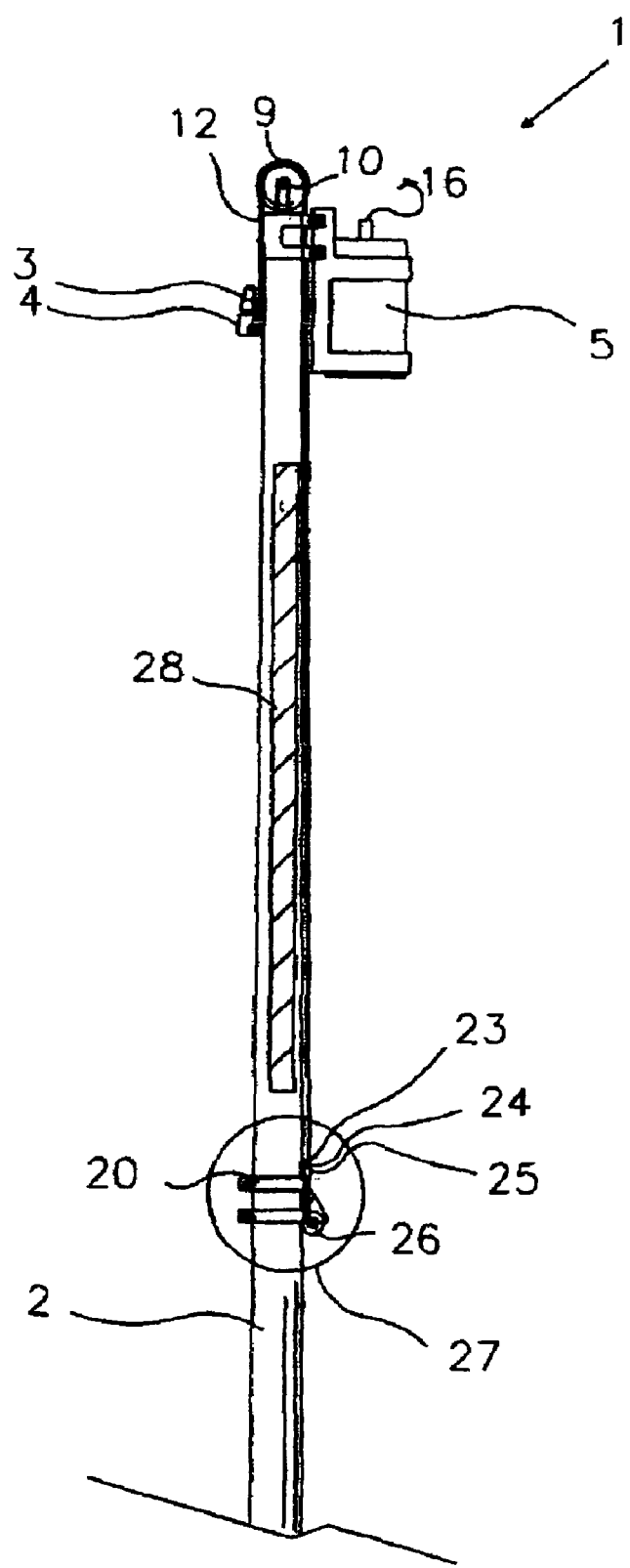
FIG. 5. is a side view of a Utility Pole Safety and Protection Device according to the present invention.

FIG. 5 is a side view of FIG. 4 and shows that the cable 12 is a continuous piece attached to the docking brace 22, passing through docking yoke 21 and over the pulley 9 down to anchor bracket 20 and its attachment 26. The cable 12 is linked by the release pin 24 which is housed in the release body 23. An optional pressure sensor 25 is linked to cable 12 and may also be disposed at any point along the linkage. When activated, pressure sensor 25 signals both the audible 17 and visual 16 alarms. An optional descent buffer 28 is shown attached to pole 2 and is linked to cable 12 to slow the descent of the conductors 15, cross arm 4 and other members of the assembly. A transformer 5 is provided a mounting means and positioned with pole bracket 11 and transformer bracket 18 (see FIG. 9).

Figure 6:
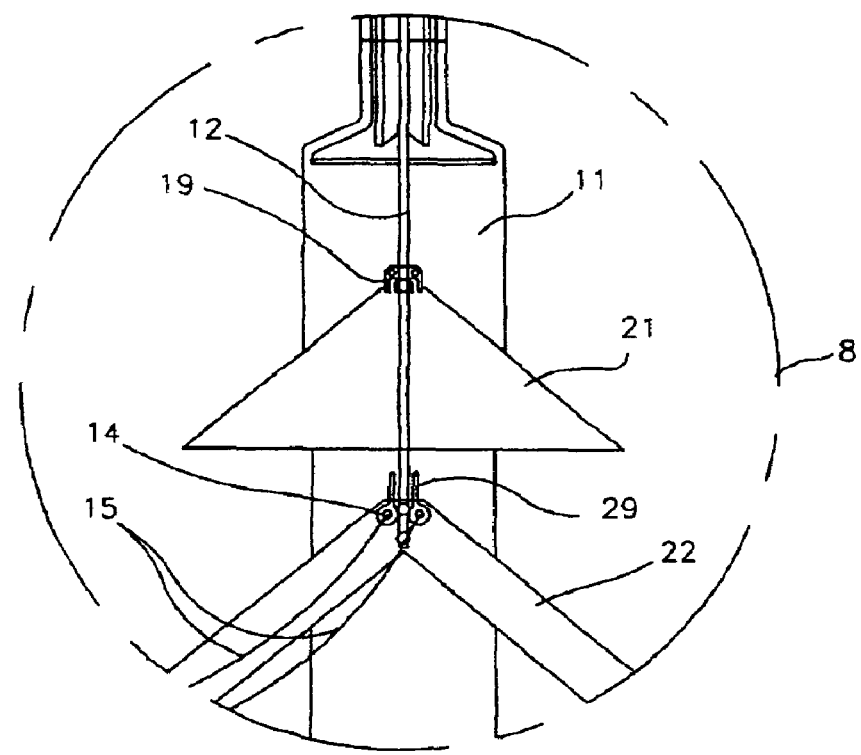
FIG. 6. is a detailed view of the upper portion of a Utility Pole and Tower Safety and Protection Device according to the present invention.

FIG. 6 is the detail 8 from FIG. 4, which reveals the continuity block 19 where it is affixed to pole bracket 11. A set of disconnect conductors 15, attached to continuity electrodes 14, are normally seated in a continuity block 19 where it completes the "normally closed" circuit to signal a switching station. FIG. 6 illustrates a disconnect condition as the docking brace 22, disconnect conductors 15 and continuity electrodes 14 have moved out of docking yoke 21 and the continuity block 19, which opens the normally closed circuit.

Figure 7:
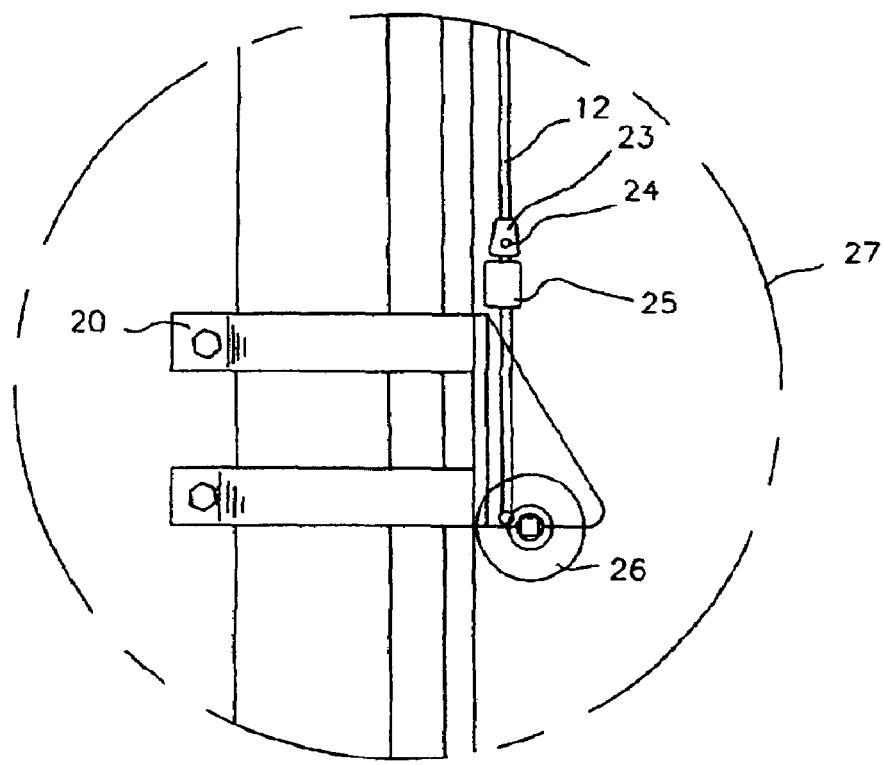
FIG. 7. is a detailed view of the lower portion of a Utility Pole and Tower Safety and Protection Device according to the present invention.

FIG. 7 is the detail 27 from FIG. 5, which reveals how the anchor bracket 20 adjustably connects to a utility pole 2 or tower. The anchor bracket 20 provides a base to connect and reconnect a winch 26 with the cable 12. The cable 12 is shown with a tension or pressure sensor 25 and a release 24 and release housing 23. The release 24 is linked to the sensor 25 and is activated by the sensor 25 as a load threshold is met or exceeded in the cable 12.

Figure 8:
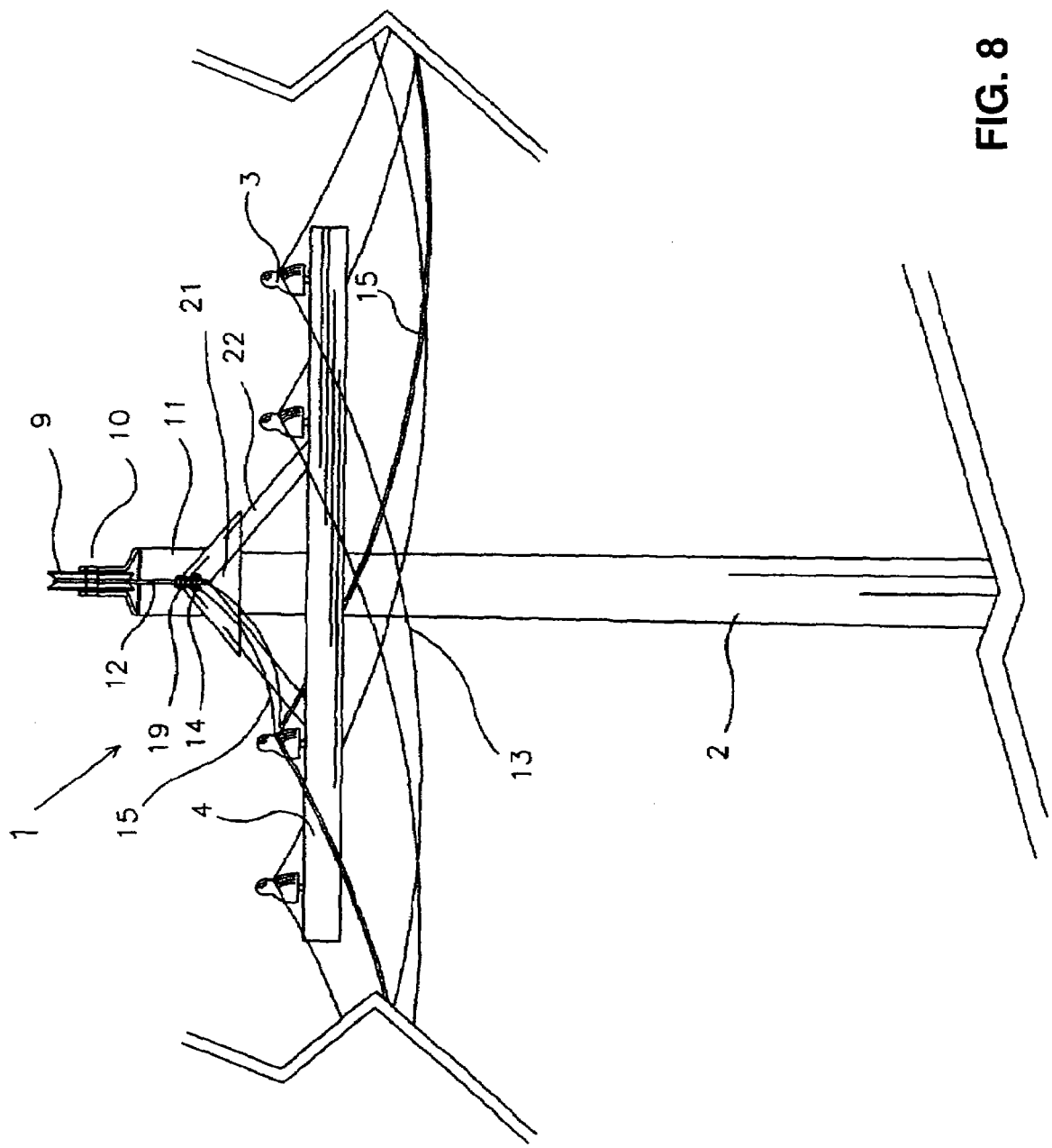
FIG. 8. is a close frontal view of the upper assembly of a Utility Pole and Tower Safety and Protection Device according to the present invention.
Figure 9:
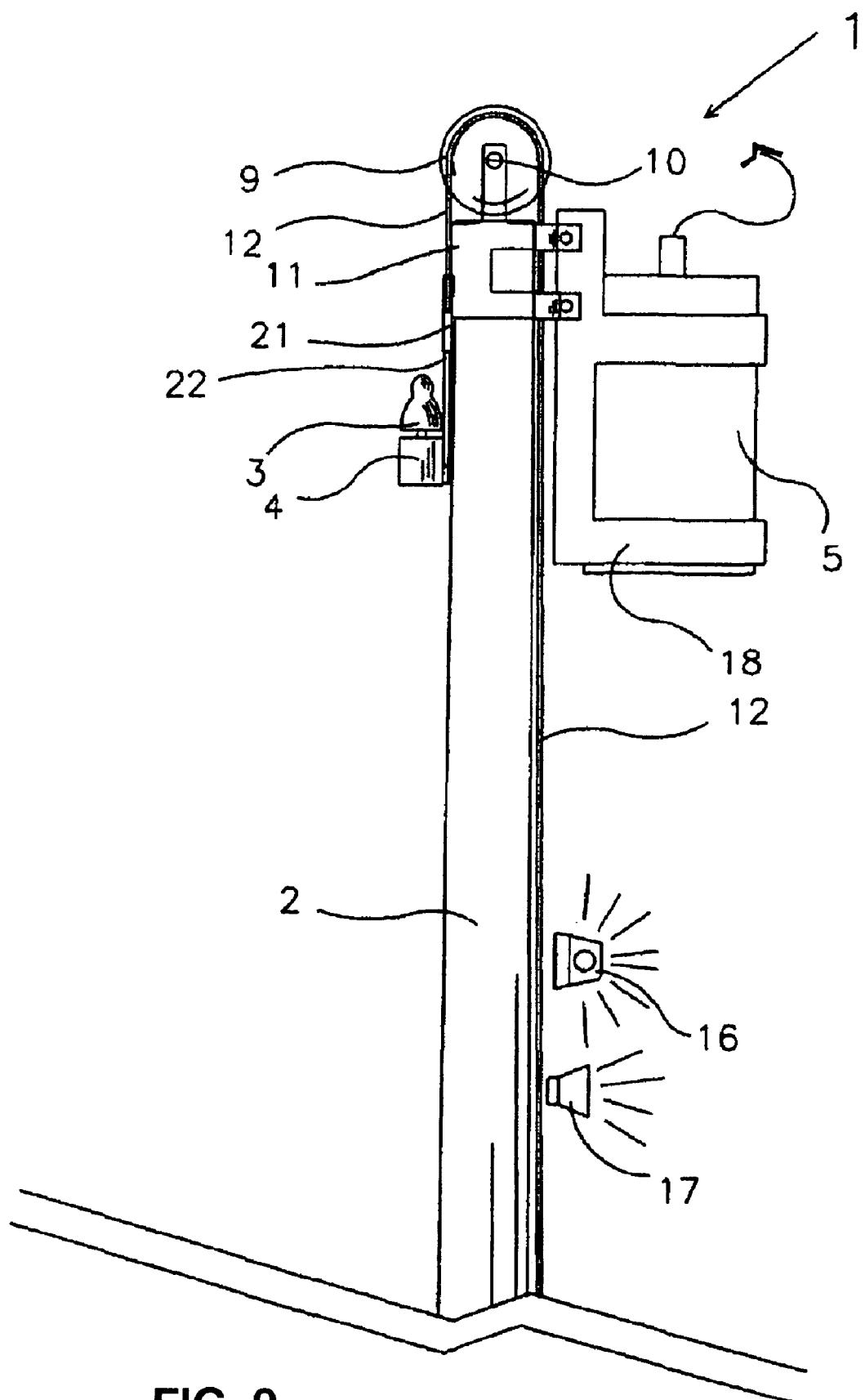
FIG. 9. is a close side view of the upper assembly of a Utility Pole and Tower Safety and Protection Device according to the present invention.

FIGS. 8 and 9 are a close view of the utility pole and tower safety and protection device 1 showing the components of the assembly and how interference and conflict are avoided during vertical movement. FIG. 8 shows the orientation of the components as they are mounted to the pole during normal operation. FIG. 9 is a view directly from the side and shows how transformer 5, transformer bracket 18, and the audible 17 and visual 16 alarms are attached opposite the crossbar 4, away from any descending components. FIGS. 8 and 9 show the device as it appears in use under normal operating conditions and as it stands ready to provide its unique safety and protection functions.

The disconnect conductor 15 links the utility pole and tower safety and protection device at each pole 2 to a central relay station. As the device is actuated at a pole 2, a signal is sent to the relay station so that repair crews can be immediately dispatched to the exact pole 2, or set of poles that are affected. Power or other service to the affected utility conductors 13 is automatically terminated as the device is activated, thus neither the repair crews nor the customers will be placed into danger by utility conductors 13 at or near the ground level. The utility conductors 13 are terminated either at the central station or using a magnetic switch sector control as discussed in FIG. 12.

Figure 10:
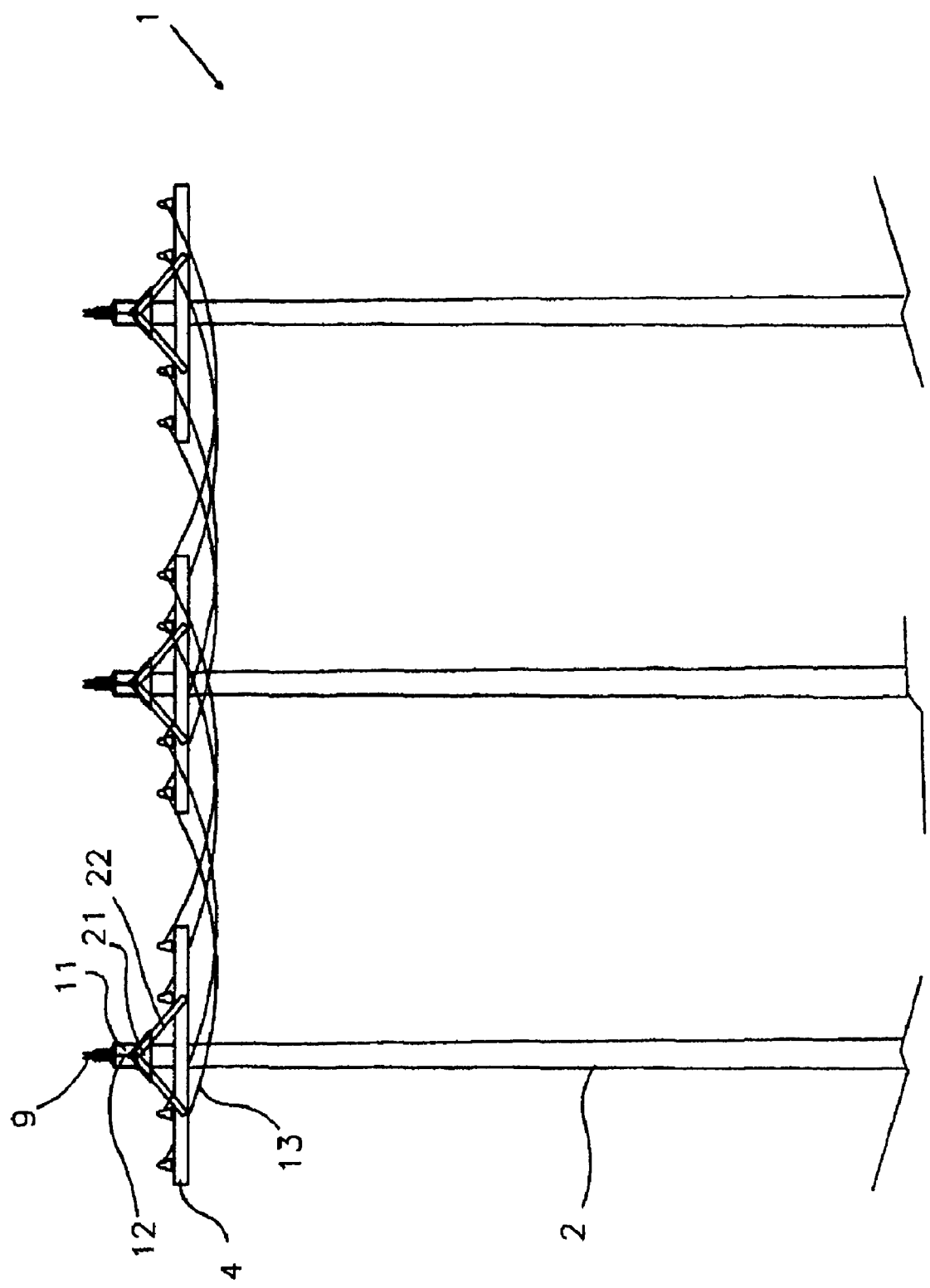
FIG. 10. is a perspective view of a line of Utility Pole and Tower Safety and Protection Devices in normal operating condition according to the present invention.

FIG. 10 illustrates multiple assemblies of the invention 1 in normal operating condition. Each pole 2 incorporates the device 1.

Figure 11:
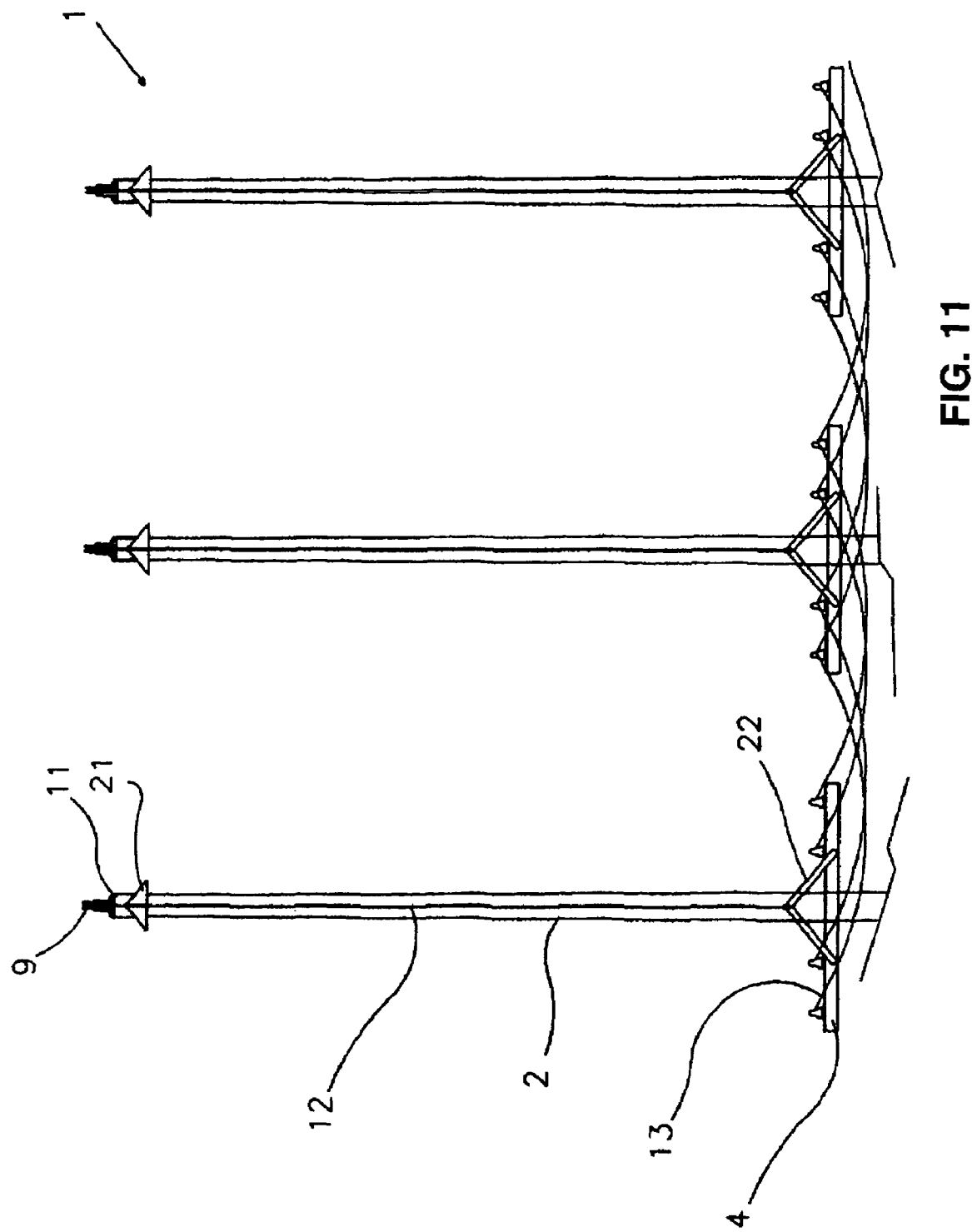
FIG. 11. is a view of a line of activated Utility Pole and Tower Safety and Protection Devices according to the present invention.

FIG. 11 illustrates the general effect of the device 1 as it is activated. FIG. 11 shows the crossbar 4, docking brace 22, down at ground level on cable 12. The utility conductors 13, being disconnected from their source of power, have contacted the ground safely. The cross arm 4 is unbroken and the entire assembly is ready to be reset.

Figure 12:
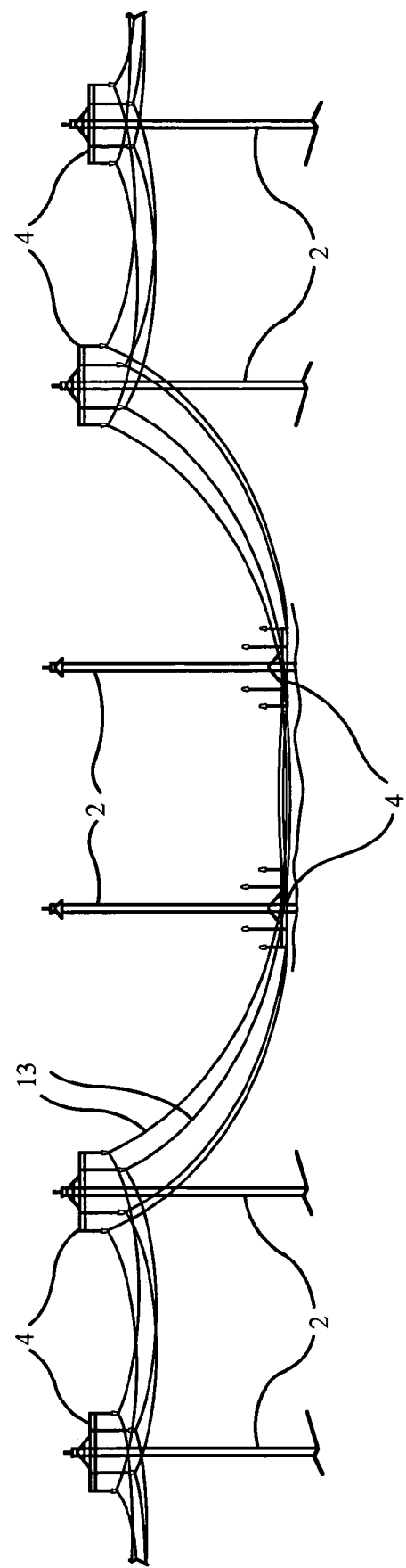
FIG. 12 shows the operation of the system within a sector containing numerous linked utility poles.

FIG. 12 shows sector operations using the utility pole and tower safety and protection device 1. Note that the device 1 has been activated on two of the poles 2, due to an external force, such as a fallen tree or ice buildup. The activation of the device at one pole 2 does not automatically mean that every linking device is activated as well. The device at each pole is capable of responding to its own sensor. Thus, activation at one pole does not mean an uncontrolled cascade at each linking pole. A sector control mechanism, such as a magnetic switch turns off power to that segment of the utility conductor 13, so that no hot lines are near the ground. In one embodiment, the sector control mechanism has a sensing switch at the docking yoke 21. When the docking yoke 21 falls away from docking brace 22 the sensing switch cuts off the power to the insulator switches that electrically connect the two sides of the utility conductors 13.

Figure 13:
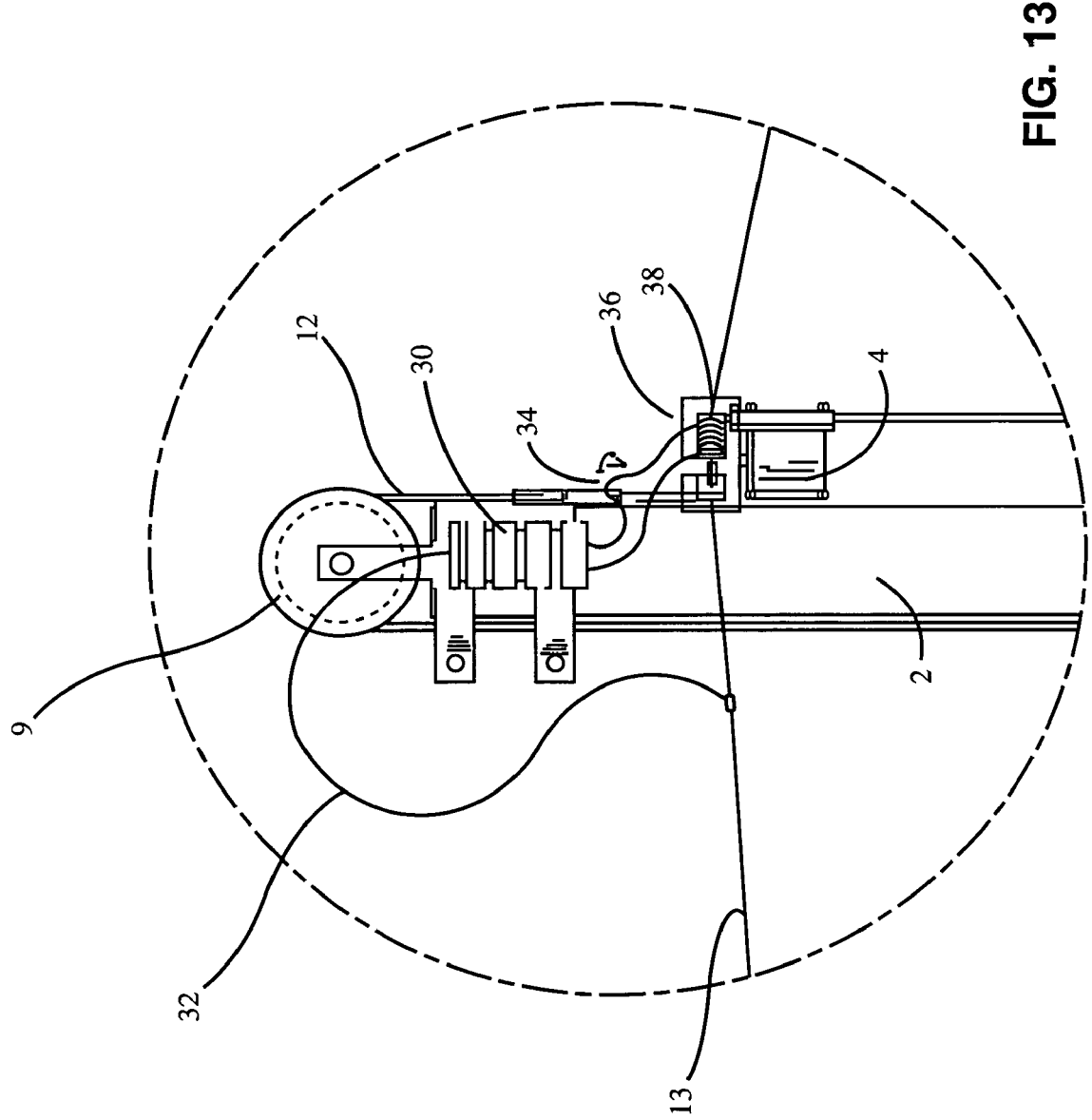
FIG. 13 shows a side view of the sector control mechanism, according to the present invention.

FIG. 13 shows a more detailed view of the sector control for the utility pole and tower safety protection device 1. A low voltage transformer 30 receives power from a power tap 32 that is attached to the utility conductor 13. The low voltage transformer 30 provides power to a toggle switch or continuity block 34. The toggle switch 34 provides power to an insulator 36 on the crossbar 4 or the docking brace 22. The insulator 36 includes an electromagnetic breaker 38 that depends on power from the toggle switch 34. The breaker 38 controls the flow of power through the conductor 13.

The toggle switch 34 is in a closed position when the crossbar 4 is raised to its normal position. However, when the crossbar 4 is lowered, in response to an external load on the conductors 13 or other appropriate response, the toggle switch 34 is tripped to create an open circuit to the insulator 36 and its breaker 38. This destroys the continuity of the conductor 13 and prevents a hazardous situation when the conductors 13 are at ground level.

When the crossbar 4 and the conductors 13 are raised to the top of the pole 2, the toggle 34 and the breaker 38 are reset to provide continuity through the conductor 13. As power begins to flow through the conductor 13, the low voltage transformer 30 again provides power to the breaker 38.

It will also be understood that, in addition to safety and protection the device can be used to streamline new utility line construction buy negating the need to climb poles or towers. All construction can be made on the ground where it easily and safely accessed.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

I claim:

1. A utility pole and tower safety and protection device comprising:
    a release mechanism attached between the a utility pole and a utility conductor assembly;
    a pressure sensor attached to the release mechanism; and
    a service disruption mechanism attached between the release mechanism and a utility conductor.

2. The utility pole and tower safety and protection device of claim 1, further comprising an alarm linked to the release mechanism.

3. The utility pole and tower safety and protection device of claim 2, where the alarm is linked to a relay station.

4. The utility pole and tower safety and protection device of claim 2, where the alarm further comprises an audible and visual alarm system.

5. The utility pole and tower safety and protection device of claim 1, further comprising a descent mechanism attached between the utility pole and the utility conductor assembly.

6. The utility pole and tower safety and protection device of claim 1, where the release mechanism is a shear pin.

7. The utility pole and tower safety and protection device of claim 1, further comprising a lifting mechanism attached to the utility pole and the utility conductor assembly.

8. The utility pole and tower safety and protection device of claim 7, where the lifting mechanism is a winch and cable.

9. The utility pole and tower safety and protection device of claim 1, where the service disruption mechanism is a magnetic switch.

10. A method of operating a utility pole and tower safety and protection device, comprising the steps of:
    (a) monitoring an external load upon a utility conductor assembly;
    (b) when the external load is at or above the protection threshold, activating a release mechanism;
    (c) activating a service disruption mechanism; and
    (d) lowering the utility conductor assembly to the ground.

11. The method of operating a utility pole and tower safety and protection device of claim 10, where step (a) further comprises the step of:
    (a1) establishing a maximum external load for the utility conductor assembly.

12. The method of operating a utility pole and tower safety and protection device of claim 10, where step (b) further comprises the step of:
    (b1) activating an alarm.

13. The method of operating a utility pole and tower safety and protection device of claim 10, where step (b) further comprises the step of:
    (b1) signaling a relay station.

14. The method of operating a utility pole and tower safety and protection device of claim 10, where step (c) further comprises the step of:
    (c1) terminating a utility transmission through the utility conductor.

15. A method of operating a utility pole and tower safety and protection device, comprising the steps of:
    (a) inspecting a utility conductor assembly;
    (b) when the utility conductor assembly is acceptable, raising the utility conductor assembly up the utility pole;
    (c) connecting a release mechanism to the utility conductor assembly;
    (d) establishing continuity through the utility conductor; and
    (e) initiating a utility transmission through the utility conductor.

16. The method of operating a utility pole and tower safety and protection device of claim 15, where step (a) further comprises the step of:
    (a1) determining a cause for a disconnected utility conductor.

17. The method of operating a utility pole and tower safety and protection device of claim 15, where step (a) further comprises the step of:
    (a1) removing an excessive external load from a utility conductor.

18. The method of operating a utility pole and tower safety and protection device of claim 15, where step (c) further comprises the step of:
    (c1) replacing a shear pin.

\* \* \* \* \*